United States Patent [19]

Taylor

[11] 3,924,337

[45] Dec. 9, 1975

[54] HEIGHT GAGE

[76] Inventor: James L. Taylor, 928 Juanita Ave., LaVerne, Calif. 91750

[22] Filed: July 17, 1974

[21] Appl. No.: 489,176

Related U.S. Application Data

[63] Continuation-in-part of Ser. No. 313,699, Dec. 11, 1972, abandoned.

[52] U.S. Cl. .............................. 33/169 R; 33/172 E
[51] Int. Cl.² .......................................... G01B 7/00
[58] Field of Search ........... 33/172 E, 143 L, 174 L, 33/169 R, 147 N, 154 D, 140, 1 M, 125 C, 174 R, 170; 308/3 A, 216

[56] References Cited
UNITED STATES PATENTS

| | | | |
|---|---|---|---|
| 491,926 | 2/1893 | Nutt | 33/170 |
| 3,272,021 | 9/1966 | Weber | 74/25 |
| 3,688,410 | 9/1972 | Zeidler | 33/125 M |

*Primary Examiner*—Richard E. Aegerter
*Assistant Examiner*—Willis Little

[57] ABSTRACT

An improved height gage is provided which includes a vertical column of rectangular cross-section, and a carriage which rides up and down the column as various heights are being measured. An electric encoder is mounted on the carriage, and it has a drive shaft in line contact with one edge of the column. The encoder supplies electric pulses to an electronic read-out circuit which, in turn, controls a display unit. The carriage is mounted on the column by means of three bearings, which are individually adjustable to establish the drive shaft in precise line contact with the edge of the column, and also to adjust the inclination of the drive shaft with respect to the horizontal for calibration purposes. The invention provides an instrument by which height measurements may be made and displayed quickly and accurately, and to a high degree of precision and resolution, on a direct basis and without the need for any calculations or other notations.

8 Claims, 9 Drawing Figures

HEIGHT GAGE

This application is a continuation-in-part of Copending Application Ser. No. 313,699 filed Dec. 11, 1972 now abandoned.

BACKGROUND OF THE INVENTION

The prior art height gage has been in existence for many years, and it is a basic measuring instrument. In the use of the prior art height gages, it is necessary to adjust the gage to a first reference height by rough and vernier adjustments, and by reading rough and vernier scales inscribed on the gage. The reference reading is then recorded, and a second reading is the made at the height to be measured, also by rough and vernier adjustments. In the prior art practice, the second reading is recorded, and the reference reading is subtracted from the second reading in order to determine the unknown height with respect to the selected reference.

The prior art height gages, for the most part, are not particularly accurate since the vernier adjustments are usually made by turning a vertical lead screw, and the accuray of the vernier adjustments depend on the observer and tolerances of the pitch of the lead screw. This severely limits the precision and resolution possible in such prior art instruments.

In the construction of the height gage of the present invention, on the other hand, a carriage is moved by rough and fine adjustments up and down a guide column of rectangular cross-section. As the carriage is moved up and down the column, the drive shaft of an encoder unit mounted on the carriage frictionally engages an edge of the column in line contact therewith, and the drive shaft turns as the carriage is shifted up and down the column. In the embodiment to be described, the carriage is supported on a vertical rod and, for rough adjustments is disengaged from the rod and moved to the vicinity of the position at which the height measurement is to be made. Then, the carriage is again engaged with the rod, and the rod is turned to make the fine adjustment. However, all movements of the carriage up and down the column are sensed by the encoder unit, whose drive shaft has a precise relationship with the column, and no reliance whatever is made on mechanical tolerance of the rod itself.

Because of the line contact between the encoder drive shaft and the edge of the column, adequate frictional engagement may be achieved between the two elements without the need for excessive pressure, which could cause microscopic deformation to the elements with resulting inaccuracies in the height measurements. Also, as mentioned briefly above, the carriage is supported on the column by bearings which may be adjusted individually to establish a precrise line contact between the encoder drive shaft and the edge of the column, and which also may be adjusted to set the drive shaft at a particular inclination across the edge, to control its effective diameter for calibration purposes.

In the operation of the height gage of the invention, and as will be described, it is merely necessary to set the instrument to a reference height by means of the rough and fine adjustments, and by then setting the reading on the associated display unit to zero. The carriage may then be shifted by the rough and fine adjustments precisely to the height to be measured, and the reading on the display unit is then a direct measurement of the previously unknown height dimension with respect to the reference height. Thus, all calculations are eliminated, since the instrument reads the desired height directly. This permits an operator to perform inspection and layout rendition up to ten times faster than with the usual prior art type of height gage, and on a vastly more precise and accurate basis.

The encoder unit itself may be of any known type, and it generates electric pulse signals to the associated electronic readout circuitry, the display unit being electrically connected to the read-out circuitry by an appropriate cable or telemetric transmitting system. The electronic circuitry includes an up-down counter so that an up or down count of the pulse signals generated by the encoder may be effectuated, and this enables an indicator in the display unit to display numbers corresponding to the actual height measured by the gage.

As mentioned briefly above, the carriage of the height gage of the invention may be adjusted on the vertical column in a simple manner to calibrate the output readings of the instrument to appropriate standards. This adjustment obviates any need for precise diameters as far as the encoder drive shaft is concerned, although the drive shaft is made round to a high degree of precision; and the rectangular vertical column is likewise held to close tolerances, insofar as the parallelism of its sides and edges is concerned.

In the embodiment to be described, the carriage is coupled to an unthreaded vertical shaft which is turned to effectuate the fine adjustments. For rough adjustments, an appropriate control is provided to de-couple the carriage from the vertical shaft, so as to permit the carriage to be manually shifted up and down the column to a desired rough position, at which the carriage is again coupled to the shaft. It will be appreciated that any movement whatever of the carriage up and down the column is sensed by the encoder so that when the carriage is set to the rough position, the indicator actually displays a number corresponding precisely to that height. Then as the carriage is finely adjusted to the final position, the minute changes in height of the carriage are reflected by changes in the display of the indicator.

DETAILED DESCRIPTION OF THE ILLUSTRATED EMBODIMENT

Figure 1:
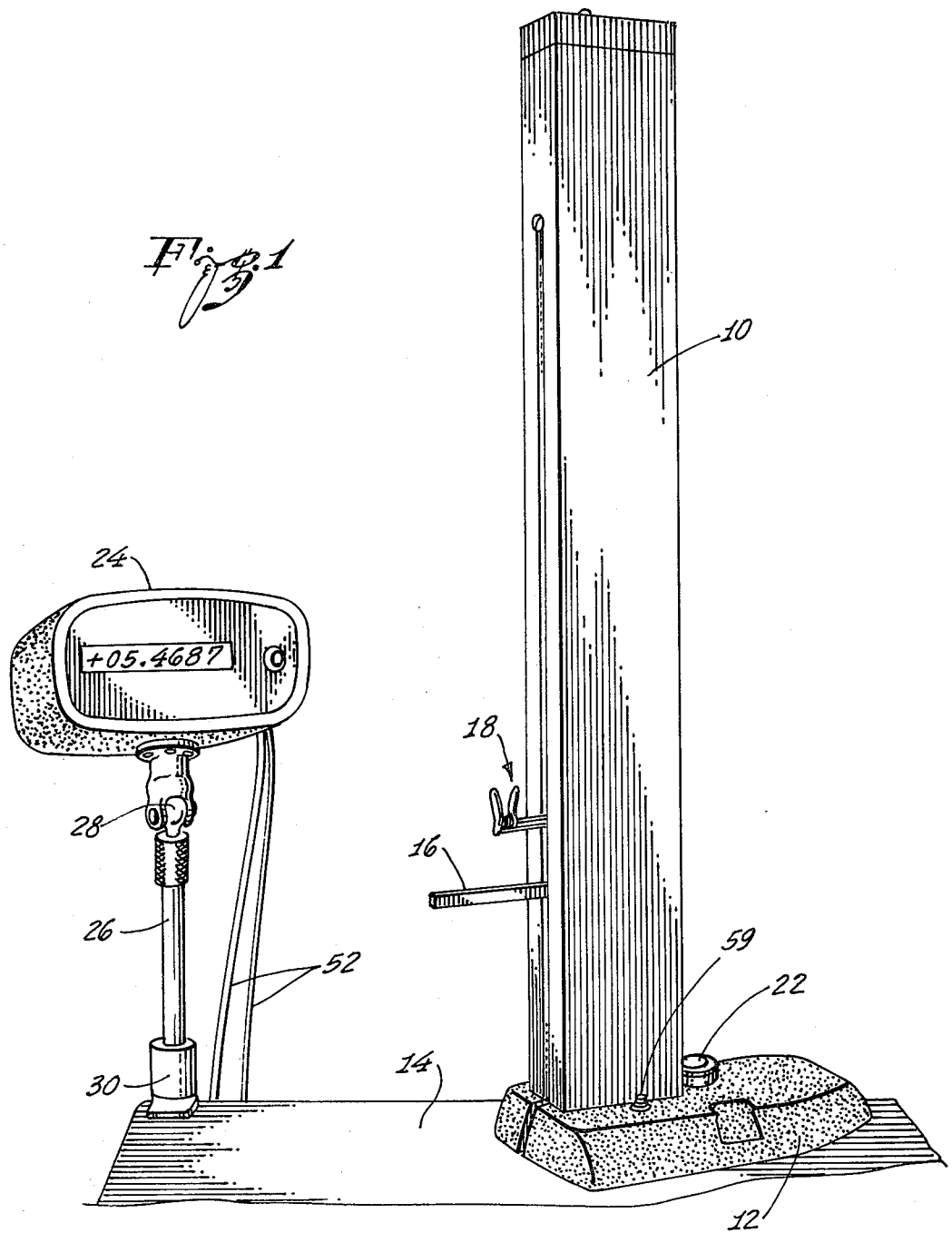
FIG. 1 is a perspective representation of a height gage constructed in accordance with the concepts of the invention.

The height gage shown in the accompanying drawings, and as illustrated particularly in FIG. 1, includes an upright cover 10 which is supported on a base 12, and which serves to enclose all the mechanical, electrical and electronic operating components of the unit. As shown, the cover 10 has an elongated configuration, and a rectangular cross-section. The base 12 may be an appropriate casting, and it should be of sufficient mass to support the unit firmly on a supporting surface, such as a table top 14. The cover 10 has a slot at one side, as shown, and a gaging arm 16 for the height gage protrudes out through the slot. The base 12 is also slotted, as shown, to allow the arm 16 to zero down onto the surface of the table top 14.

A trigger mechanism 18 protrudes out through the slot in the cover 10, and when the trigger mechanism is squeezed, the carriage of the height gage, as will be described, may be raised or lowered to any rough position which, in turn, raises or lowers the gaging arm 16, which is attached to the carriage. When the trigger mechanism 18 is released, the carriage immediately locks onto an upright rod 20 which is rotatably mounted in the base 12, and fine adjustment of the carriage and of the gaging arm may be effectuated by turning the rod 20 by means, for example, of a fine adjustment knob 22, the knob being coupled to the rod 20 through an appropriate chain drive 23 (FIG. 2).

An indicator display unit 24 (FIG. 1) is provided, the unit being mounted on the upper end of a support post 26 by means of a universal coupling 28, so that it may be tipped or rotated to a position appropriate for the best viewing. The post 26 may be clamped to the edge of the table top 14 by a C-clamp 30. The C-clamp 30 serves to clamp the display unit firmly to the edge of the table top 14.

Figure 2:
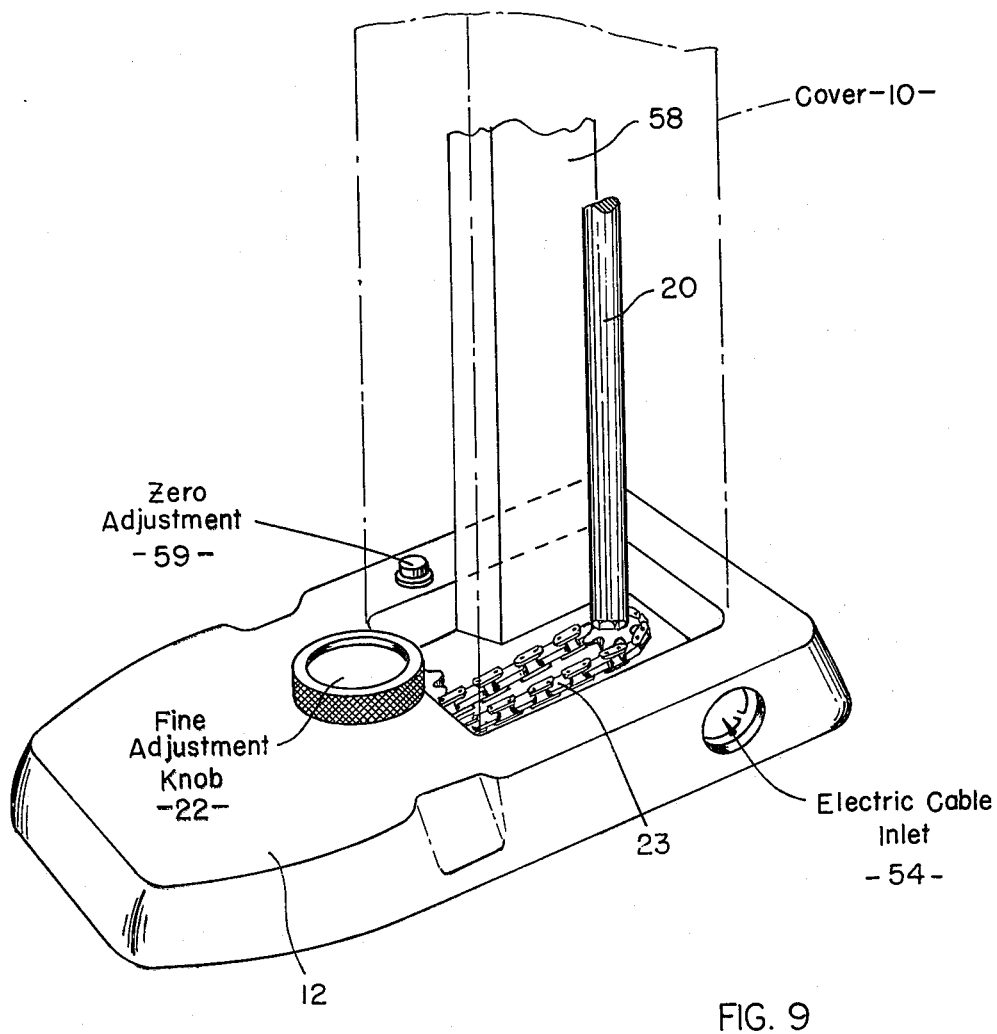
FIG. 2 is a partial fragmentary perspective of the embodiment of FIG. 1, with the cover shown in shadow form to reveal certain of the operating components of the gage.
Figure 7:
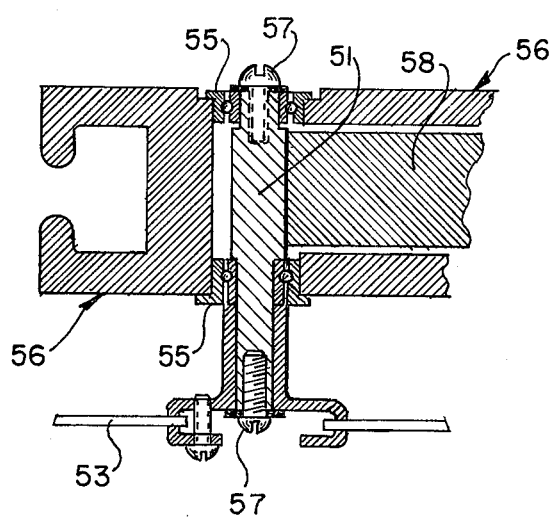
FIG. 7 is a section of the embodiment of FIG. 3 taken along the line 7—7 of FIG. 3.

The display unit 24 is electrically connected to an encoder 50 (FIGS. 3 and 4) by an appropriate electric cable 52 (FIG. 1) which extends through a hole 54 in the base 12 (FIG. 2). The encoder 50 is mounted on a carriage 56 which embraces an elongated vertical column 58 of rectangular cross-section, the carriage being selectively coupled to the upright rod 20 by the trigger mechanism 18. The encoder 50 has a drive shaft 51 (FIG. 7) which frictionally engages one edge of the column 58, and which turns in one direction or the other as the carriage 56 is moved up and down the column to turn an encoder disc 53 (FIG. 7). The column 56 is securely mounted on the base 12. It is machined and lapped with high precision, so as to exhibit absolute flatness of and parallelism between its two opposite edges. The column is preferably formed of oil hardened tool steel.

The drive shaft 51 is adjusted to a line contact with the edge of column 56 to assure no slip with approximately 20 lbs. of load. The shaft is supported in beaings 55 mounted in bores in carriage 56, the bearings being pre-loaded by screws 57. In a a constructed embodiment the shaft is adjusted to hold a tolerance of ±.0002 over 48 inches of travel of carriage 56 up or down column 58.

Figure 3:
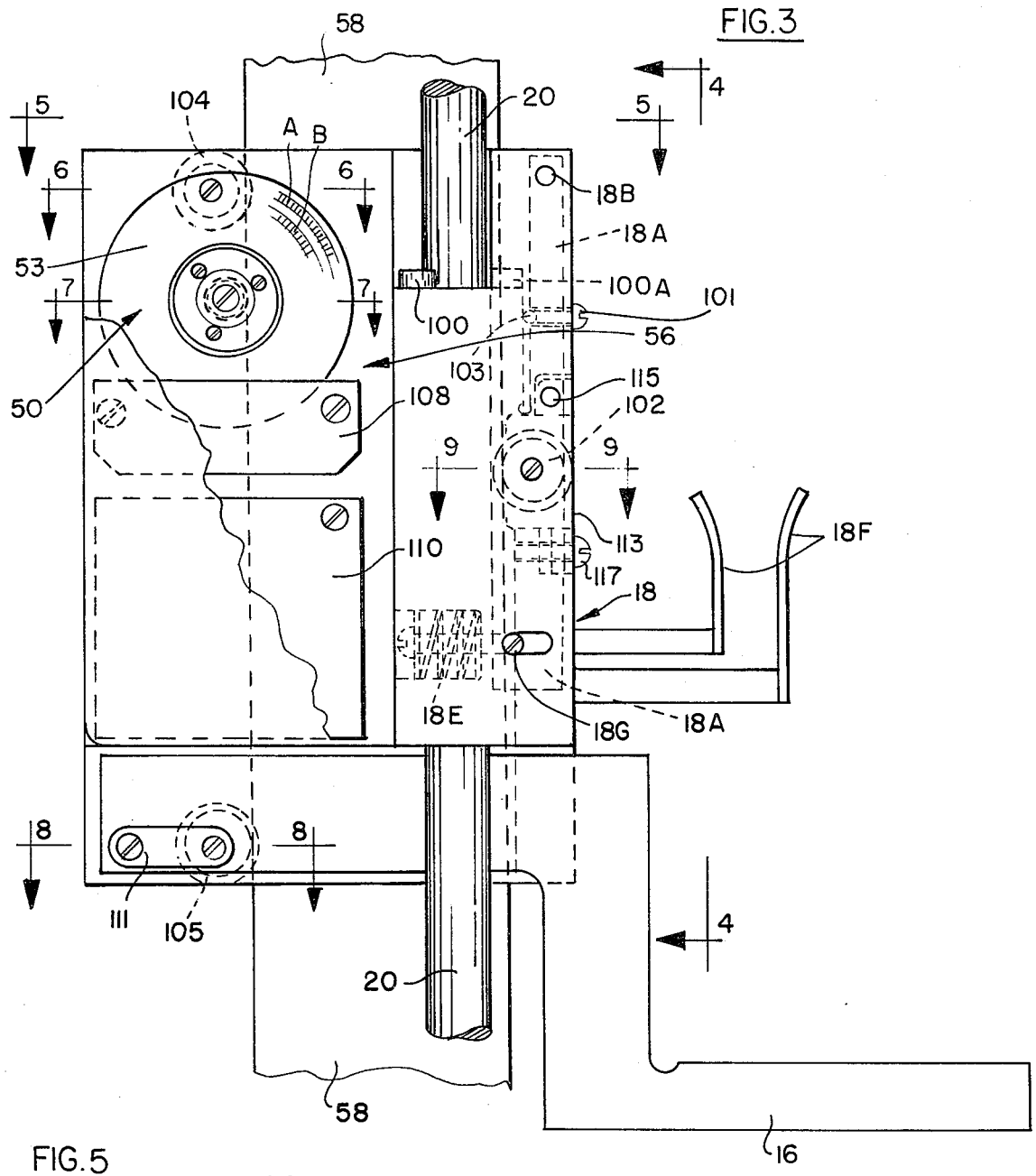
FIG. 3 is a fragmentary side elevation of the gage of FIG. 1, with the cover removed, and showing certain of the internal operating components of the height gage.
Figure 5:
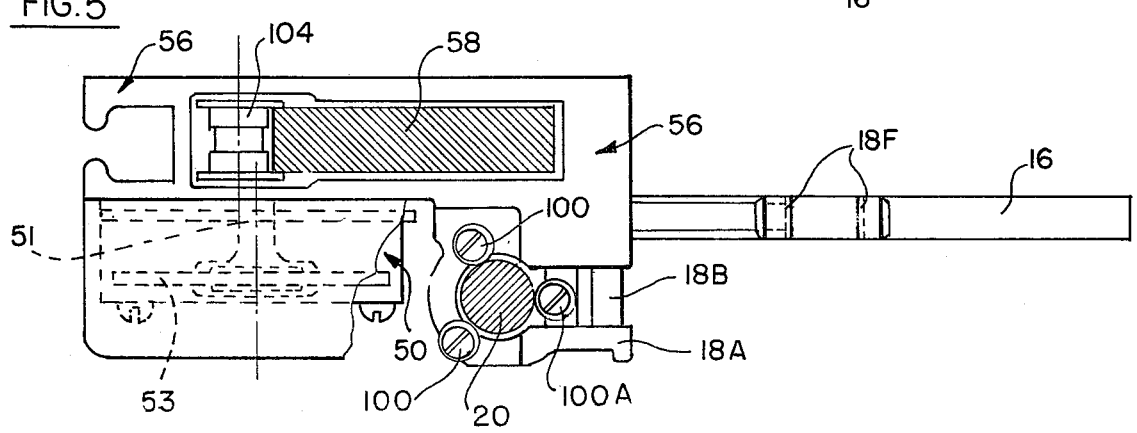
FIG. 5 is a top view of the mechanism of FIG. 3, taken along the line 5—5 of FIG. 3.

Therefore, as the carriage 56 is moved up or down the column 58, the drive shaft 51 of encoder 50 turns in one direction or the other, and it causes the encoder to generate electric pulses. These pulses are counted in appropriate electronic counting circuitry, so as to cause the indicator on the face of the unit 24 to display numbers corresponding directly to the height measurements made by the gaging arm 16. As shown in FIG. 3, the gaging arm 16 is directly connected to the carriage 56 and moves with the carriage.

When the gaging arm 16 is first set to an reference position by rough and fine adjustments, the reading on the indicator unit 24 may be set to zero by depressing a zero reset button 59 conveniently mounted on the base 12. The zero reset button 59 controls appropriate circuitry to set the reading of the indicator to zero, for any position of the carriage 56 and gaging arm 16. Such reset circuitry, per se, is well known to the art. Then, if the carriage and gaging arm are moved up the column 58, the numbers displayed by the indicator on the face of the display unit 24 are direct readings of the height measurements above the reference, and a plus (+) sign is also displayed on the indicator indicating the positive direction. On the other hand, if the carriage and gaging arm are moved down from the reference level along the column 58, the readins displayed by the indicator on the face of unit 24 are accompanied by a minus (−) sign to indicate negative measurements with respect to the reference.

As best shown in FIG. 3, the trigger mechanism 18 comprises an elongated bracket 18A which has an arcuate edge facing the rod 20 and spaced from the rod. the carriage 56 is supported on the rod 20 by three rollers 100. Two of the rollers 100 are mounted on the upper end of the carriage, and one of the rollers, namely 100A, is mounted on the upper end of the elongated bracket 18A.

The trigger mechanism 18 includes a pair of handles 18F. When the handles are released, the spring 18E biases the elongated bracket 18A towards the surface of the rod 20, to bring the roller 100A on the upper end of the bracket into firm engagement with the rod, by a lever action, since the roller 100A is closely adjacent the pivot pin 18B. This engagement by roller 100A of rod 20 draws the other rollers 100 into a firm angular engagment with the rod 20, in somewhat the same manner as the mechanism described in U.S. Pat. No. 3,272,021, so that rotation or rod 20 by knob 22 for fine adjustment purposes causes the carriage 56 to move up and down on the column 58.

When the handles 18F are squeezed, the elongated bracket 18A is pulled way from the rod 20 against the bias of spring 18E to draw the roller 100A away from the rod and permit movement of the carriage 56 by handle 16 up and down the rod for rough adjustment purposes. The angular movement of the bracket 18A is limited by a stop 18G which extends into a slot in the side of the carriage 56. Fine adjustment of the pressure with which roller 100A engages rod 20 is controlled by a set screw 101, which extends through bracket 18A and engages a ball 103 interposed between the set screw and the rod.

As the carriage moves up and down the column 58, the shaft 51 (FIG. 7) of the encoder 50 turns, and, as mentioned above, the encoder 50 generates electric pulses. The pulses from the encoder are supplied to appropriate electronic circuitry. This circuitry operates in known manner to sense the direction ov movement of the carriage by the phase relationship of the pulses, and to provide electric signals representing an up or down count over leads 52 to the indicator on the face of the unit 24 as the gaging arm 16 is moved up or down with respect to the reference position. The indicator on the face of the unit 24 may be of the usual Nixie or segment type, or it may be any other appropriate type. The indicator may display the heights in decimal digits, together with a preselected decimal point, and with the appropriate numerical signs. A constructed embodiment of the invention was found to be accurate and precise to a resolution of 0.0001 inches in height measurments.

In operating the height gage of the invention, it is merely necessary first to squeeze the handles 18F of the trigger mechanism 18 to release the carriage 56 from the rod 20, so that the gaging arm 16 may be set to a desired rough reference position, and then to release the trigger 18 and turn the fine adjustment knob 22 so that the gaging arm 16 may be precisely set to the reference position. The push button 59 is then depressed to set the indicator on the face of the display unit 24 to zero. The trigger mechanism 18 is again actuated, and the gaging arm 16 is moved to the vicinity of the height which is to be measured. Then, again the trigger mechanism is released and knob 22 is turned so that the gaging arm 16 may be precisely adjusted to the unknown height.

The display on the face of the unit 24 is then a direct measurement of the height to be determined. If the movement of arm 16 was in one direction from the reference a "plus" (+) sign indication is displayed by the indicator, and if it was moved in the other direction from the reference a "minus" (−) sign indication appears. Thus, the actual height differential from the reference is indicated directly by the display on the face of unit 24 without the need for any notations, calculations, or the like, on the part of the operator.

Figure 9:
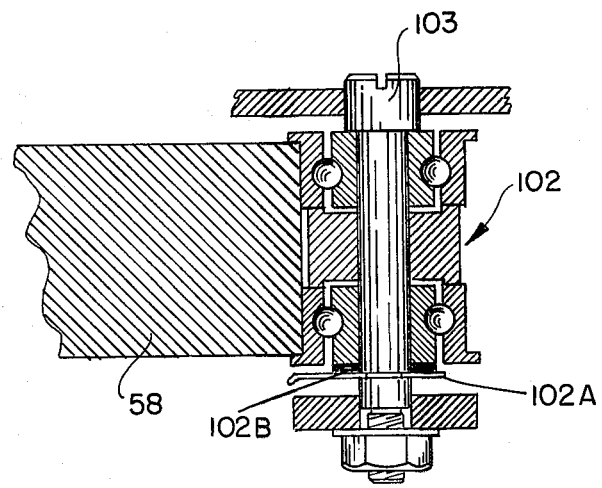
FIG. 9 is a section taken along the line 9—9 of FIG. 3.
Figure 4:
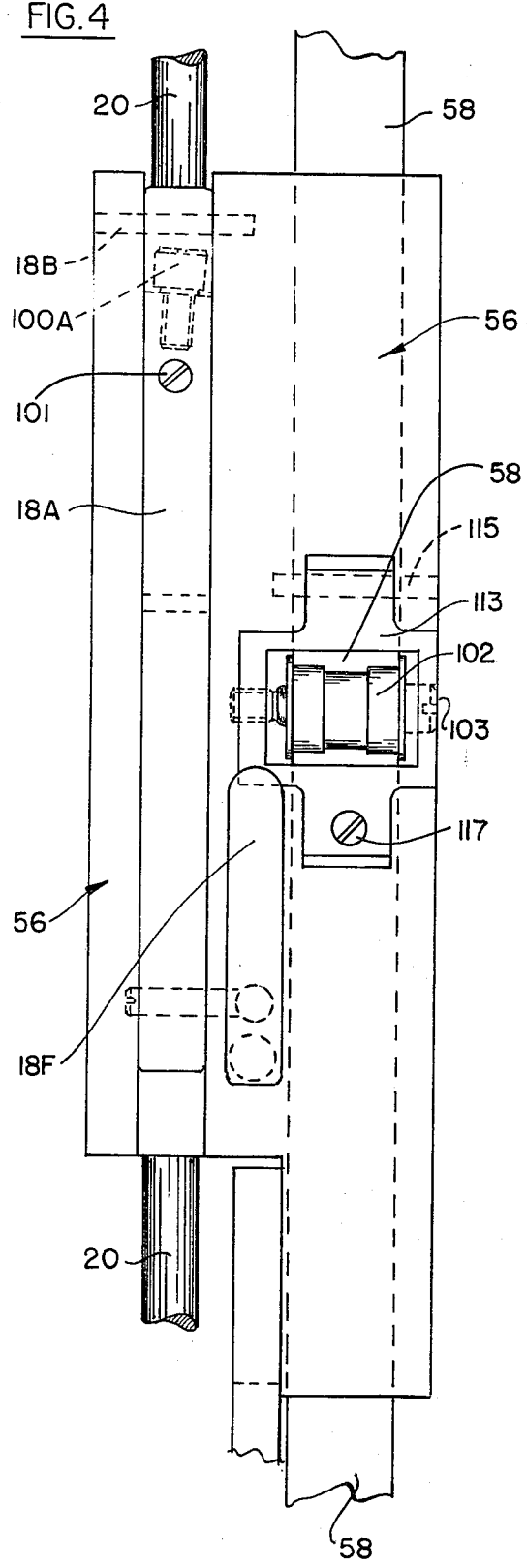
FIG. 4 is a side elevation of the gage of FIG. 3, taken along the lines 4—4 of FIG. 3.
Figure 6:
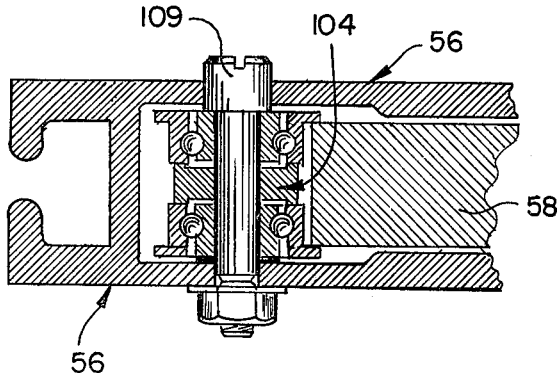
FIG. 6 is a section of the embodiment of FIG. 3 taken along the line 6—6 of FIG. 3.
Figure 8:
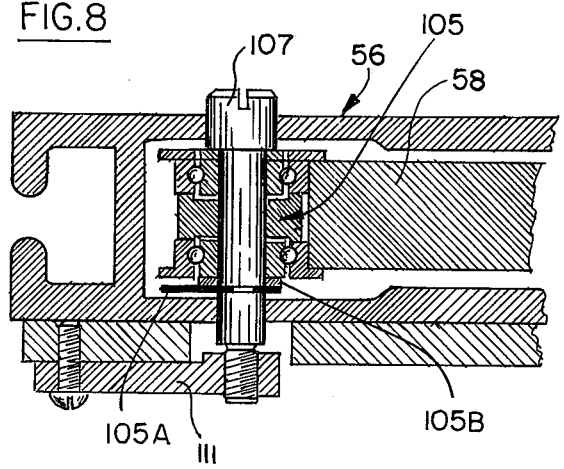
FIG. 8 is a section taken along the line 8—8 of FIG. 3.

As best shown in FIGS. 3 and 4, the carriage 56 is supported on the rectangular column 58 by a flanged front bearing assembly 102 (FIG. 9) and by a pair of flanged rear bearing assemblies 104 (FIG. 6) and 105 (FIG. 8). These bearing assemblies have the form shown in FIGS. 6, 8 and 9. The bearing assembly 104 as shown in FIG. 6, has side flanges which engage the sides of the column 58 adjacent its edge. The bearing assemblies 102 and 105 have similar side flanges which, likewise, engage the sides of the column 58, as shown in FIGS. 8 and 9.

Each of the bearing assemblies 102, 104, 105, has an adjustment screw which provides minute transverse adjustments for the bearings. For example, the bearing 102 (FIG. 9) is adjusted by turning its screw 103 so as to tilt the carriage 56 slightly about a vertical axis extending, for example, between the bearing assemblies 104, 105. The bearing 102 is so adjusted until a precise line contact between the shaft 51 of the encoder 50 and the surface of the adjacent edge of the column 58 is achieved. A precise line contact is indicated when the unit displays the same readings for repeated calibrating operations. The bearing 102 is supported on screw 103 by a snap ring 102A and selected spacer 102B.

The intermediate portion of the bearing assembly 104 does not actually engage the edge of the column 58 as shown in FIG. 6. However, the intermediate portion of the bearing 105 does engage the edge of the column as shown in FIG. 8 and the intermediate portion of the bearing assembly 102 engages the opposite edge of the column as shown in FIG. 9, so that the two bearings 102 and 105 provide actual supports for the carriage on opposite edges of the column.

The bearing 105 may be adjusted by turning its adjustment screw 107 (FIG. 8) so as to tilt the carriage slightly about a horizontal axis extending, for example, through the bearing assembly 102. The bearing is supported on the screw 107 by a snap ring 105A and selected spacer 105B. Such a tilt of the carriage causes the drive shaft 51 of the encoder 50 to extend across the surface of the adjacent edge of the column 58 at a slight calibrated angle to the horizontal which slightly changes the effective diameter of the drive shaft and relationship between the movement of the carriage up and down the column 58 and the turning of the shaft.

In this way, a precise calibration may be made by adjustment of the screw 107 of the bearing assembly 105 so that the measurements displayed by the module 24 may be calibrated with a high degree of precision with respect to known standards. The bearing 104 provides a calibration reference point for the bearing 102, 105. It will be appreciated that although the intermediate portion of the bearing 104 does not engage the surface of the adjacent edge of column 58, the flanges of the bearing assembly do engage the sides of the column adjacent that edge to prevent side play of the carriage 56 with respect to the column. The screw 109 (FIG. 6) is tightened to pre-load the bearing so that the flanges are brought to within 0.0001/0.0002 clearance with the sides of column 58. By calibrating the assembly in ther manner described above, it has been found in a constructed embodiment, that is possible to hold and repeat readings to a precise resoultion of 0.0001 inches over the entire gage travel.

As described above, the encocer 50 is mounted on the carriage 56 so that its shaft 51 extends through a supporting bearing 55 (FIG. 7) in direct frictional contact with the edge of the column 58. The encocer, thereofre, is directly coupled to the column through the firctional engagement between the shaft 51 and the edge of the column, and no gearing, or other coupling means is used. The shaft 51 of the encoder in the constructed embodiment has a diameter of under one half an inch, and it is machined to be absolutely round.

As shown in FIG. 3, the read head 108 for the encoder 50 is mounted directly on the carriage 56, as shown, and the circuit board 110 containing the electronic circuitry is also mounted on the carriage directly under the read head. The disc 53 of encoder 50 may have two or more tracks A, B, thereon, (FIG. 3), so that metric, British, or other standards may be measured direcly by the height gage. In the constructed embodiment, the diameter of the encoder disc 51 is 1.6 inches, and the encoder generates 7200 pulses per revolution, which approaches the practical limits for that particular sixe of disc.

The calibration adjustments of the angle of the encoder shaft 51 from the horizontal causes its engagement with the edge of the column 58 to become an ellipse instead of a true circle thus changing its effective diameter. Thus the slight adjustment provided by the bearing assembly 105 permits a tilt of the shaft from the horizontal to calibrate the system, for example, within a latitude of several throusandths of an inch. During this adjustment, the side play of the carriage is fixed by the bearing assembly 104, as the bearing assembly 105 is moved side-ways in FIG. 8 by the fine screw adjustment of its screw 107 into a nut plate 111. This permits the carriage to tilt and to maintain an exact tilt of the shaft 51 during the travel of the carriage. The bearing assembly 102 is mounted on a bracket 113 (FIGS. 3 and 4) which is pivotally mounted on carriage 56 by a pin 115. The screw 110 can then be tightened to establish a desired pressure at which bearings 102 and 105, and shaft 51 engage the column 58. In this way bias springs for the bearings are not required, and a precise shaft pressure may be maintained.

The invention, provides, therefore, an improved instrument for making height measurements quickly and accurately, and to a high degree of resolution, and one that is easy to operate and provides height measurements with respect to any given reference on a direct basis.

While a particular embodiment of the height gage of the invention has been shown and described, modifications may be made, and it is intended in the following claims to cover all the modifications which fall within the true spirit and scope of the invention.

What is claimed is:

1. A height gage including: a base; an elongated upright guide column of rectangular cross-section mounted on said base; a carriage; first, second and third bearing assemblies rotatably mounted on said carriage to enable said carriage to be movable up and down said column; an upright rod rotatably mounted on said base adjacent to said column; a rotatably mounted fine adjustment knob; means coupling said knob to said rod to cause rotation of said rod upon rotation of said knob; means coupling said carriage to said rod to cause said carriage to move up and down said column as said rod is rotated by rotation of said fine adjustment knob; spring loaded trigger means connected to said last-named coupling means for selectively decoupling said last-named coupling means from said rod to permit said carriage to be freely moved up and down said column; an encoder mounted on said carriage and including a drift shaft engageing the edge of said column in frictional line contact therewith for rotation of said drive shaft as said carriage is moved up and down said column to cause said encoder to generate electric signals, the first and second of said bearing assemblies and said encoder drive shaft engaging opposite edges of said column for supporting the carriage on the column, and the third of said bearing assemblies being spaced from the edge of said column and having guide flanges engaging the column; and an electronic display unit electrically coupled to said encoder.

2. The height gage defined in claim 1, and which includes manually operated means electrically connected to said electronic display unit for setting the reading of said display unit to zero for any reference setting of the gage.

3. The height gage defined in claim 1, in which the third and first of said bearing assemblies are mounted respectively at the top and bottom of the carriage in position to engage one edge of the column, and the second of said bearing assemblies is mounted at an intermediate position on the carriage in position to engage the opposite edge of said column, and in which said encoder drive shaft is positioned under the third bearing assembly in position to engage said one edge of said column.

4. The height gage defined in claim 3, and which includes means coupled to said second bearing assembly to enable said second bearing assembly to be adjustable along its longitudinal axis to control the tilt of the carriage about a vertical axis so as to establish a line contact between the shaft of the encoder and the adjacent edge of the column.

5. The height gage defined in claim 3, and which includes means coupled to at least one of said first and third bearing assemblies to cause the same to be adjustable along the longitudinal axis thereof to control the tilt of the carriage about a horizontal axis and establish the effective diameter of the drive shaft of the encoder for calibration purposes.

6. The height gage defined in claim 3, and which includes means connected to said second bearing assembly to adjust the pressure at which the encoder shaft engages the edge of the column.

7. The height gage defined in claim 1, in which said coupling means includes rollers making spring-biased angular contact with the rod.

8. The height gage defined in claim 7, in which said coupling means includes an elongated bracket pivotally connected to said carriage, and in which one of said rollers is mounted on said bracket adjacent to the pivotal axis thereof.

* * * * *